(12) United States Patent
Kothnur et al.

(10) Patent No.: US 8,061,118 B2
(45) Date of Patent: *Nov. 22, 2011

(54) METHOD FOR TUNING VALVES FOR PRIMARY AND SECONDARY FUEL CIRCUIT

(75) Inventors: Vasanth Srinivasa Kothnur, Clifton Park, NY (US); Shivakumar Srinivasan, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/855,638

(22) Filed: Sep. 14, 2007

(65) Prior Publication Data
US 2008/0000214 A1    Jan. 3, 2008

Related U.S. Application Data

(62) Division of application No. 10/995,265, filed on Nov. 24, 2004, now Pat. No. 7,269,939.

(51) Int. Cl.
*F02C 9/00* (2006.01)
*F02G 3/00* (2006.01)

(52) U.S. Cl. .................................................. 60/39.281

(58) Field of Classification Search ............... 60/39.281, 60/734, 739, 772, 773, 776
See application file for complete search history.

(56) References Cited

U.S. PATENT DOCUMENTS

| | | | |
|---|---|---|---|
| 2,676,461 | A | 4/1954 | Gove |
| 5,024,055 | A | 6/1991 | Sato et al. |
| 6,598,383 | B1 | 7/2003 | Vandervort et al. |
| 6,609,380 | B2 | 8/2003 | Mick et al. |
| 6,722,132 | B2 | 4/2004 | Stuttaford et al. |
| 6,729,135 | B1 | 5/2004 | Norris et al. |
| 7,188,465 | B2 | 3/2007 | Kothnur et al. |

(Continued)

FOREIGN PATENT DOCUMENTS

EP    0 529 900 A1    3/1993

(Continued)

OTHER PUBLICATIONS

"Gas Turbine Parameter Corrections", A.J. Volponi, Journal of Engineering for Gas Turbines and Power, Oct. 1999, vol. 121, pp. 613-621.

(Continued)

*Primary Examiner* — William Rodriguez
*Assistant Examiner* — Andrew Nguyen
(74) *Attorney, Agent, or Firm* — Nixon & Vanderhye P.C.

(57) ABSTRACT

A method for adjusting fuel flow to individual combustion chambers in a gas turbine having fuel nozzles for each combustion chamber, manifolds for supplying fuel to at least one fuel nozzle in each combustion chamber, wherein the manifolds have flow metering devices for the fuel nozzles and a controller for adjusting the flow metering devices, the method including: supplying fuel to the combustion chambers through at least one of the manifolds; combusting the fuel in the combustion chambers and generating exhaust gases which drive the gas turbine; determining whether one of the combustion chambers is operating relatively lean or rich by actuating a corresponding to the one of the combustion chambers to adjust fuel flowing to the one of the combustion chambers; sensing a condition of the exhaust gases at various exhaust regions in the exhaust gases and determining a change in the condition of the exhaust gas due to the actuation of the flow metering device, and correlating the change in the sensed condition of the exhaust gases to the at least one combustion chamber.

27 Claims, 5 Drawing Sheets

U.S. PATENT DOCUMENTS

| | | | |
|---|---|---|---|
| 7,260,937 B2 * | 8/2007 | Kothnur et al. | 60/773 |
| 2002/0183916 A1 * | 12/2002 | Cleary | 701/100 |
| 2003/0144787 A1 * | 7/2003 | Davis et al. | 701/100 |
| 2004/0025512 A1 | 2/2004 | Davis, Jr. et al. | |
| 2005/0097895 A1 * | 5/2005 | Kothnur et al. | 60/776 |
| 2006/0090471 A1 | 5/2006 | Shah et al. | |

FOREIGN PATENT DOCUMENTS

| | | |
|---|---|---|
| EP | 1 331 448 A2 | 7/2003 |
| WO | WO 2005/047670 | 5/2005 |

OTHER PUBLICATIONS

Speedtronic™ Mark V Gas Turbine Control System, D. Johnson, R.W. Miller and T. Ashley, GER-3658D, pp. 1-19.

"Speedtronic™ Mark V Steam Turbine Control System", J. Kure-Jensen and W. Barker, GER-3687C, pp. 1-15.

"Gas Turbine Emissions and Control", Roointon Pavri and Gerald D. Moore, GE Power Systems, GER-4211, pp. 1-32.

Speedtronic™ Mark VI Turbine Control System, Walter Barker and Michael Cronin, GE Power Systems, GER-4193A, pp. 1-14.

"Dry Low $No_x$ Combustion Systems for GE Heavy-Duty Gas Turbines", L.B. Davis and S.H. Black, GE Power Systems, GER-3568G, pp. 1-22.

International Search Report completed Mar. 6, 2006.

* cited by examiner

US 8,061,118 B2

METHOD FOR TUNING VALVES FOR PRIMARY AND SECONDARY FUEL CIRCUIT

CROSS RELATED APPLICATION

This is a divisional application of U.S. Patent application Ser. No. 10/995,265 filed Nov. 24, 2004, the entirety of which is incorporated by reference.

BACKGROUND OF THE INVENTION

This invention relates to actuating fuel trim valves in a gas turbine applied to tune each combustion chamber. In particular, the invention relates to a system and method for automatically actuating fuel trim valves to a plurality of combustion chambers.

Combustors in industrial gas turbines have a plurality of combustion chambers arranged around a turbine casing. High pressure air from the compressor flows into the chambers where the air is mixed with fuel. Fuel is injected into the chambers through nozzles. Hot gases generated by the combustion of the air and fuel mixture flow from the combustion chambers into the turbines which generally include a high-pressure turbine to drive the compressor and a low-pressure turbine to provide output power.

Each combustion chamber defines a generally cylindrical combustion zone. Upstream of the combustion zone, the chambers each have a plurality of fuel nozzles that inject fuel into the zone. Fuel flow to each nozzle (or group of nozzles) is regulated by a trim valve. Adjusting the trim valve provides a degree of precise control of the amount of fuel flowing to each fuel nozzle in each combustion chamber. Trim valves may be used to tune fuel flow to each combustion chamber in a gas turbine such that combustor pressure oscillations, nitrous oxides, carbon monoxide, and unburned hydrocarbons are minimized. A prior fuel trim system is disclosed in published U.S. patent application Ser. No. 2003/0144787 A1.

Fuel trim valves are commonly used to adjust the fuel entering each nozzle of a combustion chamber in a multi-chamber combustor of an industrial gas turbine. Generally, trim valves are used to optimize the mixture of fuel and combustion air entering each combustion chamber such that the combustion of the air-fuel mixture minimizes the production of nitrous oxides ($NO_x$), carbon monoxide (CO) and unburned hydrocarbons (UHC). To minimize CO and UHC and achieve overall greater efficiency, it is desirable to increase the combustion temperature within the gas turbine. However, the oxidation of $NO_x$ in gas turbines increases dramatically with the increase in combustion temperatures.

Fuel trim valves provide a means to adjust the fuel flow to individual nozzles and combustion chambers to compensate for the variations in the fuel-to-air ratio to each chamber. Setting the air-fuel ratio often involves a careful balance between: (1) increasing gas turbine efficiency and/or minimizing unburned hydrocarbons carbon monoxide (UHC) and carbon monoxide (CO) by increasing combustion temperature and (2) decreasing the combustion temperature to minimize nitric oxides ($NO_x$) by thinning the air-fuel ratio. It is extraordinarily difficult to achieve uniform temperature and pressure distributions in the multiple combustion chambers of an industrial gas turbine. Variations in the airflow between the combustion chambers make it difficult to maintain a constant air-fuel ratio in all combustion chambers. CO emissions tend to be more sensitive to fuel-to-air ratio variations from chamber to chamber than are NOx emissions. Tuning airflow to individual combustion chambers may be applied to reduce the overall level of CO emissions while maintaining satisfactory gas turbine operation.

Fuel supply systems are known that have multiple manifolds for supplying fuel nozzles with fuel in each combustion chamber of a multi-chamber gas turbine. It is not conventional to have a fuel trim valve for controlling each fuel nozzle in each combustion chamber or to provide each fuel nozzle in each combustion chamber with a fuel trim valve. There are several difficulties to providing fuel trim valves to each fuel nozzle in each combustion chamber including: (1) there is limited piping room in a gas turbine engine to incorporate a fuel trim valve for each fuel nozzle; (2) to increase efficiency it is typical to incorporate multiple fuel manifolds so that the pressure drop across each fuel trim valve is within a small uniform range; and (3) manually adjusting each of the fuel trim valves in each combustion chamber is a Herculean task.

There is a long-felt need for systems and methods to control the air-fuel ratio of a multi-chamber gas turbine. What is also needed are systems and methods to control the air-fuel mixture in each combustion chamber of a multi-chamber gas turbine such that the combustion chamber pressure oscillations are reduced, and emissions of combustion chamber pressure oscillations, $NO_x$, UHC and CO are minimized for a given energy output level of the gas turbine. There is also a need for simple systems and methods for automatically adjusting each fuel valve in each combustion chamber, such that the air-fuel ratio in each combustion chamber can be optimized to minimize combustion chamber pressure oscillations and reduce emissions of $NO_x$, UHC and CO for the gas turbine. There is also a need to devise a trim valve tuning strategy that interprets the gas turbine combustion dynamics, emissions, exhaust temperature spreads and other sensor data so as to achieve a proper setting for each fuel valve that trims flow for each combustion chamber.

SUMMARY OF THE INVENTION

The subject gas turbines have multiple combustion chambers, and within each chamber are multiple fuel nozzles. Each nozzle has its own fuel trim control valve to control the fuel flowing to the nozzles. To minimize the pressure drop through the fuel control valves, multiple manifolds are employed. Each manifold supplies fuel to at least one fuel nozzle in each of the multiple combustion chambers. The fuel trim control valves are mounted on the manifolds such that the weight of the fuel trim control valves and nozzles are carried by the manifolds, and not by the combustion chambers. The manifolds are compactly arranged around the casing of the gas turbine. Each manifold supplies fuel to at least one fuel nozzle in each of the multiple combustion chambers.

Thermocouples for measuring exhaust gas from said multiple combustion chambers are employed to sense gas exhaust temperature. A plurality of combustion dynamics sensors measure combustor dynamics, e.g. cold tones, in each combustion chambers. Emission sensors are employed at the gas turbine exhaust to measure UHC, NOx and CO emissions from the combustion chambers.

A computer controller and a series of electronic or mechanical actuators automatically adjust the trim valves to tune the nozzles in the combustion chambers. The controller receives inputs from: temperature sensors at the exhaust, fuel pressure sensors in gas manifolds downstream of each fuel valve, dynamic pressure sensors on each combustion chamber and emissions sensors in the turbine exhaust and stack. Based on these inputs, the controller adjusts the trim valves to tune the combustion reaction in the individual chambers to minimize nitrous oxides, unburned hydrocarbons and carbon monoxide in the turbine exhaust gases. The combustion reaction in each combustion chamber may also be balanced relative to the combustion reaction in the other combustion chambers. For example, each of the multiple combustion chambers may be tuned such that no specific combustion chamber is operating with an air-fuel ratio that is rich or lean as compared to other chambers. The chambers may also be tuned so that each chamber operates at an air-fuel ratio within about one percent of the ratio of the remaining combustion chambers.

In one embodiment, the invention is a gas turbine combustion system comprising: a plurality of combustion chambers; a plurality of fuel nozzles for each of said combustion chambers; a plurality of manifolds for supplying fuel to at least one fuel nozzle in each of the combustion chambers; each of said multiple manifolds having fuel trim control valves for said fuel nozzles, wherein said fuel trim control valves are mounted on said multiple manifolds for metering the fuel to the fuel nozzles in the combustion chambers, and a trim valve controller automatically actuating one or more of the fuel trim valves to adjust fuel to the fuel nozzles based on gas turbine operating conditions. The gas turbine operating conditions may comprise a profile of exhaust gas temperatures and wherein the controller correlates certain regions of the profile of the exhaust gas temperatures to one or more of the combustion chambers and the controller actuates the fuel trim valves to modify the profile of exhaust gas temperatures. The gas turbine operating conditions may further comprise dynamic pressure oscillations in the combustion chambers and the controller actuates the fuel trim valves to make dynamic pressure oscillations uniform across the combustion chambers. In addition, the gas turbine operating conditions may further comprise a profile of emission levels and wherein the controller correlates certain regions of the profile of the emission levels to one or more of the combustion chambers and the controller actuates the fuel trim valves to modify the profile of emission levels. The manifolds may each comprise an annular octopus arrangement of fuel supply lines connecting the manifold to one of the fuel nozzles, wherein the trim control valves are each mounted on a respective fuel supply line.

In another embodiment, the invention is a gas turbine combustion system comprising: a plurality of combustion chambers; a plurality of fuel nozzles for each of said combustion chambers; a plurality of manifolds for supplying fuel to at least one fuel nozzle in each of the combustion chambers; each of said multiple manifolds having orifice plates or other flow metering devices in the fuel line supplying fuel for said fuel nozzles, and the orifice plates or other flow metering devices are sized to minimize combustor pressure oscillations, nitrous oxides, carbon monoxide, and unburned hydrocarbon in the gas turbine exhaust.

The invention may also be embodied as a gas turbine combustion comprising: a plurality of combustion chambers; a plurality of fuel nozzles for each of said combustion chambers; a plurality of manifolds for supplying fuel to at least one of the fuel nozzles in each of the combustion chambers, wherein each of the manifolds has mounted thereon fuel trim valves for said fuel nozzles; a plurality of sensors for measuring exhaust gas from the combustion chambers, a trim valve controller automatically actuating one or more of the trim valves to adjust fuel flow to the fuel nozzles based on exhaust gas data collected from the sensors. The sensors may comprise thermocouples arranged in an array to sense exhaust temperatures at different regions of the exhaust gas, and the controller correlates the sensed exhaust temperatures to individual chambers of the combustion chambers.

The invention may be embodied as a method for adjusting fuel flow to individual combustion chambers in a gas turbine having fuel nozzles for each combustion chamber, manifolds for supplying fuel to at least one fuel nozzle in each combustion chamber, wherein the manifolds have fuel trim valves for said fuel nozzles and a controller for adjusting the trim valves, the method comprising: supplying fuel to the combustion chambers through at least one of the manifolds; combusting the fuel in the combustion chambers and generating exhaust gases which drive the gas turbine; sensing a condition of the exhaust gases at various exhaust regions in the exhaust gases; correlating the sensed condition of the exhaust gases at one of the regions to a corresponding combustion chamber, and adjusting at least one of the fuel trim valves for the corresponding combustion chamber based on the sensed operating condition for the exhaust region correlated to the corresponding chamber. The method may further comprise determining whether the corresponding chamber is operating lean or rich with respect to the other combustion chambers based on the sensed condition and adjusting the fuel control valve for the corresponding combustion chamber to minimize the rich or lean condition.

The invention may also be embodied as a method of tuning fuel flow to individual combustion chambers of a gas turbine comprising: measuring exhaust gas temperatures at a plurality of exhaust regions of the gas turbine; correlating one of the measured exhaust gas temperatures to one of the combustion chambers using a swirl chart relating the exhaust regions to corresponding combustion chambers; identifying one of the combustion chambers as operating at an air-fuel mixture substantially different from a representative air-fuel mixture for all chambers based on the measured exhaust gas temperature correlated to the identified chamber, and adjusting a fuel flow to the identified combustion chamber to minimize a difference between the air-fuel mixture in the identified combustion chamber and the representative air-fuel mixture. The swirl chart may be for a specified fuel load of the gas turbine. The representative fuel air-mixture may be represented by an average exhaust gas temperature, the air-fuel mixture of the identified chamber is represented by the measured exhaust gas temperature correlated to the identified chamber, and the difference is a difference between the measured exhaust gas temperature correlated to the identified chamber and the average exhaust gas temperature. The difference may be determined as a temperature variation (Tv) for the identified combustion chamber, and Tv is equal to $(T_{eccx} - T_{gt})/T_{gt}$, where $T_{eccx}$ is a temperature of the exhaust of the identified chamber $T_{gt}$ is an average exhaust temperature of the gas turbine. The method may include comparing the measured fuel flow further comprises minimizing a fuel flow variation (Fv) between the combustion chambers by applying a formula where Fv equals $(F_{ccx} - F_{gt})/F_{gt}$, where $F_{ccx}$ is a total fuel flow to the identified combustion chamber(x), and $F_{gt}$ is an average fuel flow to each of the combustion chambers, and wherein the fuel flow to chamber(x) is reduced when Fv for chamber(x) is positive and the fuel flow the chamber(x) is increased when Fv for chamber(x) is negative, and the fuel flow is not adjusted when Fv for chamber(x) is nominal.

DESCRIPTION OF THE DRAWINGS

The systems and methods of the present invention are described herein below with reference to various figures, in which.

DETAILED DESCRIPTION OF THE INVENTION

A system and method has been developed tuning a gas turbine to increase its efficiency. In general, an efficient gas turbine is one which has the least nitrous oxides, the least amount of unburned hydrocarbons, and the least amount of carbon monoxide for a specified energy output. To tune the gas turbine, it is desirable that the fuel flow to each combustion chamber in the gas turbine be well balanced relative to the remaining combustion chambers.

The system and method tunes each of the multiple combustion chambers such that no specific combustion chamber has a rich or lean air-fuel mixture ratio. It is preferably that the air-fuel mixture in each chamber be within about one percent (1%) of the remaining combustion chambers. The chambers are tuned such that the air-fuel mixture for each chamber is moved towards an average air-fuel mixture for all combustion chambers.

Each nozzle may have its own fuel control valve to control the fuel flowing to the nozzles. To minimize the pressure drop through the fuel control valves, multiple manifolds are employed. Each manifold supplies fuel or purge gases to at least one fuel nozzle in each of the multiple combustion chambers of the combustor. The fuel control valves are mounted on the manifolds so that the weight of the fuel control valves and nozzles are carried by the manifolds, and not by the multiple combustion chambers.

In one method, the gas turbine is tuned based on the temperature distribution in the exhaust gases. The temperatures at various points around the turbine exhaust is correlated to each combustion chamber by a swirl chart that relates each combustion chamber to an exhaust region at a specified fuel load. The swirl chart and exhaust temperatures is used to identify whether each of the combustion chambers is operating rich, lean, or average. The chambers are tuned by increasing the fuel load to each of said combustion chambers identified as lean and decreasing the fuel load to each of the combustion chambers identified as rich. The fuel load to each chamber is adjusted by changing the position of the appropriate trim control valves for each chamber. The tuning process is repeated until the exhaust temperature of all of the combustion chambers is within, for example, about 1% of the average exhaust temperature. This process of minimizing variations in the exhaust temperature minimizes variations between each combustion chamber.

Figure 1:
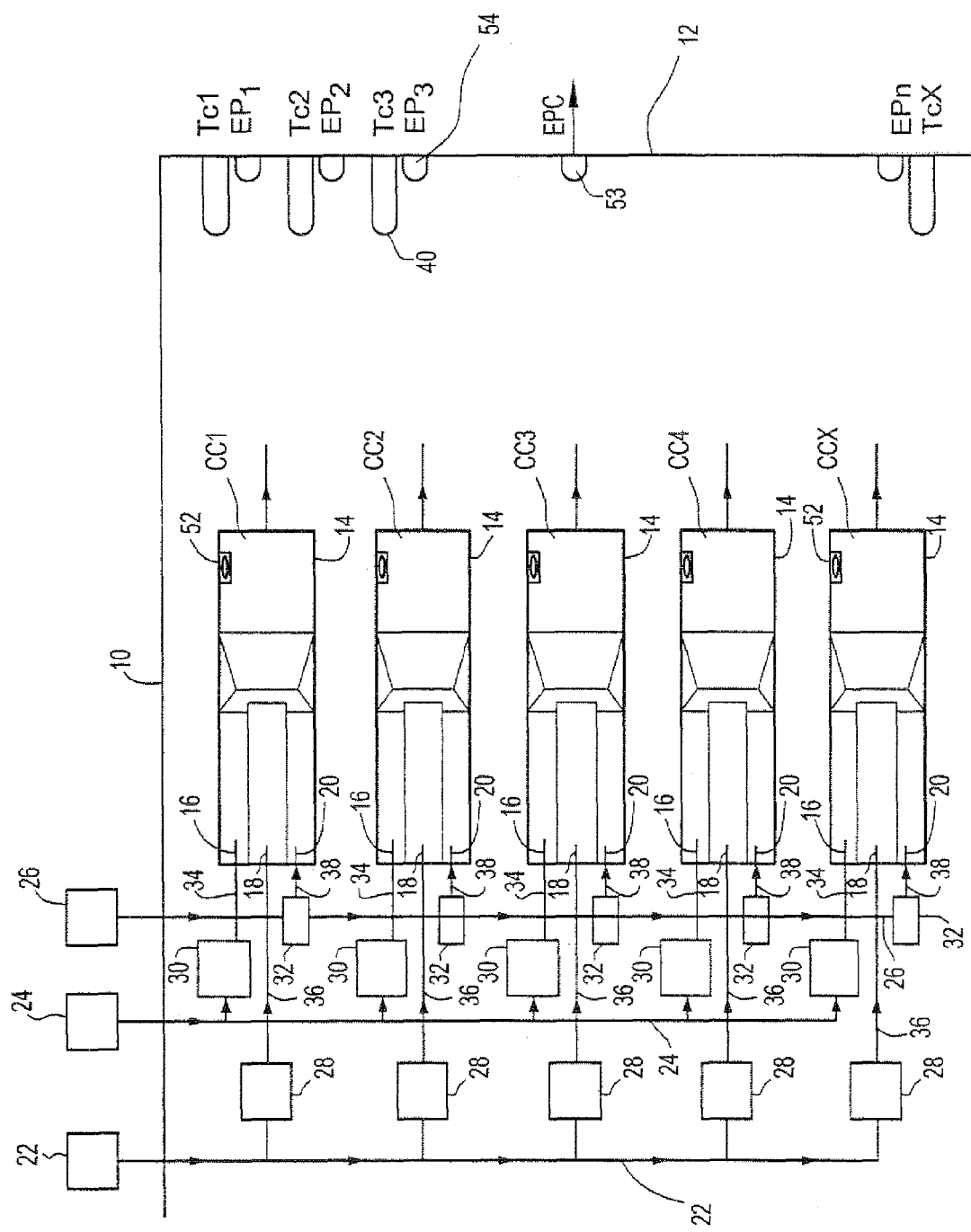
FIG. 1 is a schematic side view of combustion chambers in a gas turbine showing multiple manifolds as well as exhaust thermocouples.

FIG. 1 shows a schematic partial cross-sectional view of a gas turbine 10. Gas turbines, especially industrial gas turbines, have multiple combustion chambers 14 and within each chamber are multiple fuel nozzles 16, 18, 20. Each nozzle has its own fuel control valves 28, 30, 32 to control the fuel flowing to the nozzles. To minimize the pressure drop through the fuel control valves, multiple fuel manifolds 22, 24, 26 are generally employed. Each manifold typically supplies fuel to at least one fuel nozzle in each of the multiple combustion chambers. The fuel control valves are mounted on the manifolds such that the weight of the fuel control valves and the nozzles are carried by the manifolds, rather than the multiple combustion chambers.

FIG. 1 does not show the air compressor or details about the supply of combustion air to the gas turbine as these details are known and conventional in the art. The turbine exhaust outlet 12 of the gas turbine is downstream of the combustion chambers and associated turbine. The multiple combustion chambers 14 are shown as combustion chamber number 1 (CC1), combustion chamber number 2 (CC2), combustion chamber number 3 (CC3), combustion chamber number 4 (CC4), and so on around the gas turbine casing to combustion chamber (CCX). Depending on the energy output desired for the gas turbine 10, the number of combustion chambers 14 varies. A typical industrial gas turbine has ten to fourteen combustion chambers arranged in an annular array around a turbine casing.

At the exhaust outlet 12 of the gas turbine 10 are multiple thermocouples 40 arranged about the periphery of the gas turbine 10. The number of thermocouples (TC1, TC2, TC3 ... TC$_n$) is a mater of design. For an industrial gas turbine having ten to fourteen combustion chambers, eighteen to twenty-seven thermocouples are arranged in a circular array (and possibly concentric circular arrays). The number of combustion chambers, manifolds, nozzles and thermocouples can vary depending on the desired energy output from the gas turbine. The dynamic pressure level in each of the combustion chambers may be monitored by dynamic pressure sensors 52. Also included in the periphery of the gas turbine 10 are emission sensor ports (EP1, EP2, EP3 ... EPn) 54 distributed around the circumference of the exhaust turbine stream. It is also common to have at-least one emission sensor port (EPC) 53 that measures the overall emissions from the entire exhaust stream.

Each combustion chamber 14 has multiple fuel nozzles 16, 18 and 20 for supplying fuel to the combustion chamber. The number of fuel nozzles and their placement within each combustion chamber 14 is a matter of design. Generally, sufficient fuel nozzles are employed to obtain a uniform flow of fuel and air across each combustion chamber. Multiple manifolds 22, 24, and 26 supply each fuel nozzle 16, 18, and 20 with fuel, respectively. Multiple manifolds are employed to minimize the pressure drop from the manifold to the fuel nozzle. The number of manifolds employed is a matter of design.

Each manifold 22, 24, and 26 supports, and is fluidly connected with, fuel trim control valves 28, 30, and 32, respectively. The adjustable fuel orifices may be used instead of or in conjunction with the fuel trim control valves. Specifically, manifold 22 supports multiple fuel control valves 28, and each combustion chamber 14 is associated with at least one fuel control valve 28 that is coupled directly to manifold 22. Each fuel control valve 28 meters the amount of fuel flowing from the manifold 22 to its associated fuel nozzle 18. Likewise, fuel manifold 24 supports multiple fuel control valves 30, and each combustion chamber 14 is associated with at least one fuel control valve 30. Each fuel valve 30 meters the amount of fuel flowing from the manifold 24 to its associated fuel nozzle(s) 16. Further, manifold 26 has multiple fuel control valves 32, supported by the manifold and is fluidly coupled with each combustion chamber 14.

The fuel control valves 32 are directly coupled with the manifold 26, and with the associated fuel nozzles 20 in each combustion chamber 14. The fuel valve 32 controls the amount of fuel flowing from the manifold 26 to the fuel nozzles 20. Each manifold may connect to each associated fuel control valve, or alternatively, each manifold may connect to less than all the associated fuel control valves. It is a design choice dependent on piping space in and around the gas turbine as well as the pressure drop through the fuel control valves. Multiple supply lines 34 couple each fuel nozzle 16 to the fuel control valve 30. Likewise, each supply line 36 couples each fuel nozzle 18 with its corresponding and associated fuel control valve 28. Each supply line 38 couples each fuel nozzle 20 to the fuel control valve 32, which is fluidly connected with the manifold 26. The cost of multiple manifolds may be balanced against an excessive pressure drops as the fuel flows from the manifold through the fuel control valve, through each supply line to the fuel nozzles in each combustion chamber 14. If too many fuel control valves and associated fuel nozzles stem from a manifold, the pressure drops across each fuel control valve may not be consistent with drops across other valves.

Figure 2:
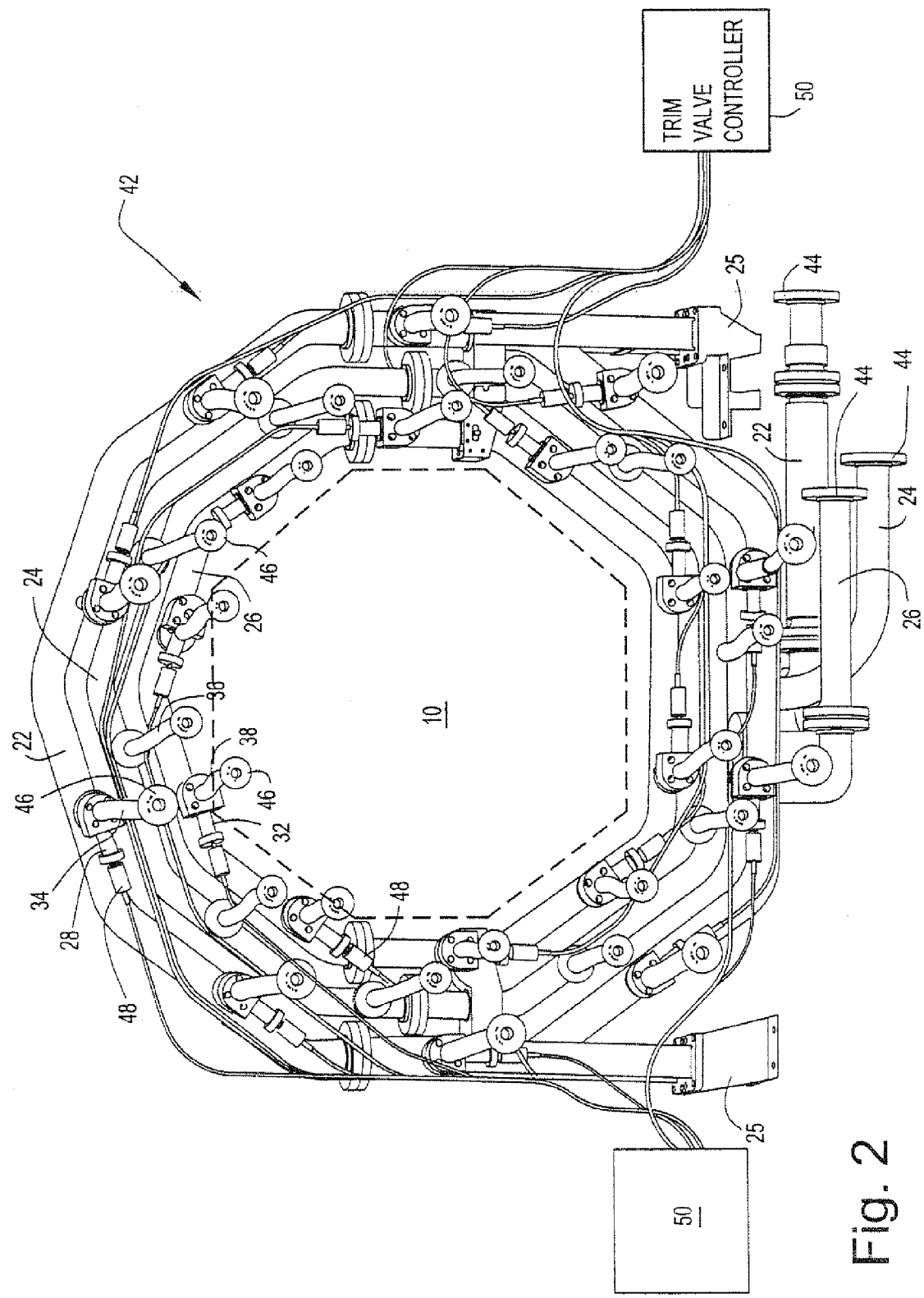
FIG. 2 is front view of an octopus arrangement of gas fuel manifolds with associated tuning vales and electrical/mechanical actuators.

FIG. 2 is a front view of an exemplary nested octopus arrangement 42 of three fuel manifolds 22, 24, 26 for a gas turbine 10. The gas turbine casing is indicated by dashed lines. The nested octopus arrangement forms an annular array around the casing of the gas turbine and may be proximate to the fuel injection end of each of the combustion chambers 14. An external frame 25 fixed to a base or ground supports the manifolds. The fuel manifolds may, for example, be a primary fuel manifold 22, a transfer manifold 24 and a secondary fuel manifold 26. The three sets of manifolds 22, 24 and 26 support and are fluidly connected with the fuel control valves 28, 30, and 32, respectively. However, one of the manifolds may provide transfer gas to purge the nozzles and fuel lines during transitions from one fuel to another. The manifolds may each be sized corresponding to the fuel or transfer gas that they carry. For example, the primary manifold 22 may be a larger size than the secondary fuel manifold.

The primary fuel manifold 22 supports several fuel control valves 28 each associated with a center fuel nozzle 18 for a respective combustion chamber 14. Each fuel control valve 28 regulates the amount of fuel flowing from the manifold 22 to its associated fuel nozzle 18. Secondary fuel manifold 26 has multiple fuel control valves 32 each associated with a fuel nozzle for a respective combustion chamber and regulating the fuel flow to those fuel nozzle(s) 20. Each manifold may connect to each associated fuel control valve, or alternatively, each manifold may connect to less than all the associated fuel control valves. The particular arrangement and size of manifolds and their respective control valves is a matter of design dependent on piping space in and around the gas turbine as well as the pressure drop through the fuel control valves.

The manifolds 22, 24, 26 each support a respective array of individual fuel supply lines 34, 36, 38. Each supply line may include at its opposite ends flanges 46 to be respectively bolted to a flexible conduit (not shown) of a fuel nozzle of the combustor. The fuel manifolds may include end flanges 44 to be coupled to conduits supplying fuel or transfer gas. The primary fuel manifold includes an annular array of primary fuel supply lines 34 that each extend towards and couples to a respective primary fuel nozzle of a combustor. Similarly, the secondary fuel manifold 26 includes an annular array of second fuel supply lines 38 that each also extend towards and connect to a respective secondary fuel nozzle of a combustor. The primary and secondary fuel supply lines each include a respective trim valve 28, 32.

The trim valves 28 on the larger primary fuel supply lines 34 may be larger, e.g., two inch valves, than the trim valves 32 on the smaller secondary fuel supply lines 38, e.g., inch and one-half valves. The transfer manifold 24 may not have trim valves and/or actuators. The transfer manifold may typically be filled with compressor discharge purge gas at high temperatures except while the combustion operation is being transitioned from one operating mode to another. During transition, purge gas from the transfer manifold is passed through the fuel nozzles to purge fuel from the nozzles before the nozzles are either closed off or transitioned to another fuel.

The trim valves are each controlled by a respective actuator 48 that is in communication with a trim valve control system 50. Flexible drive shafts (similar to a speedometer cable) have been used to actuate the trim valves from the control system 50. The use of the flexible drive shafts connecting the actuator 48 with the control system 50 allows for ease of mechanical routing inside the constrained space within the gas turbine compartment. The control system 50 may be a computer or microprocessor system that executes valve control algorithms based on certain inputs, such as fuel mode, exhaust gas temperature annular distribution and dynamic pressure in the combustion chambers.

The trim valve control system 50 transmits control signals to the actuators 48 to adjust the fuel trim valves 28 and 32. The control system may operate in accordance with executable fuel trim algorithms stored in the computer controller. The control system may also receive exhaust temperature data from temperature sensor thermocouples 40 in the exhaust, from dynamic pressure sensors 52 in the combustion chambers, emissions data (EP1 to EPn and EPC) collected from emission sensors 54 in the gas turbine exhaust, gas fuel pressure data from the manifolds and other data regarding the operating conditions of the gas turbine.

Figure 3:
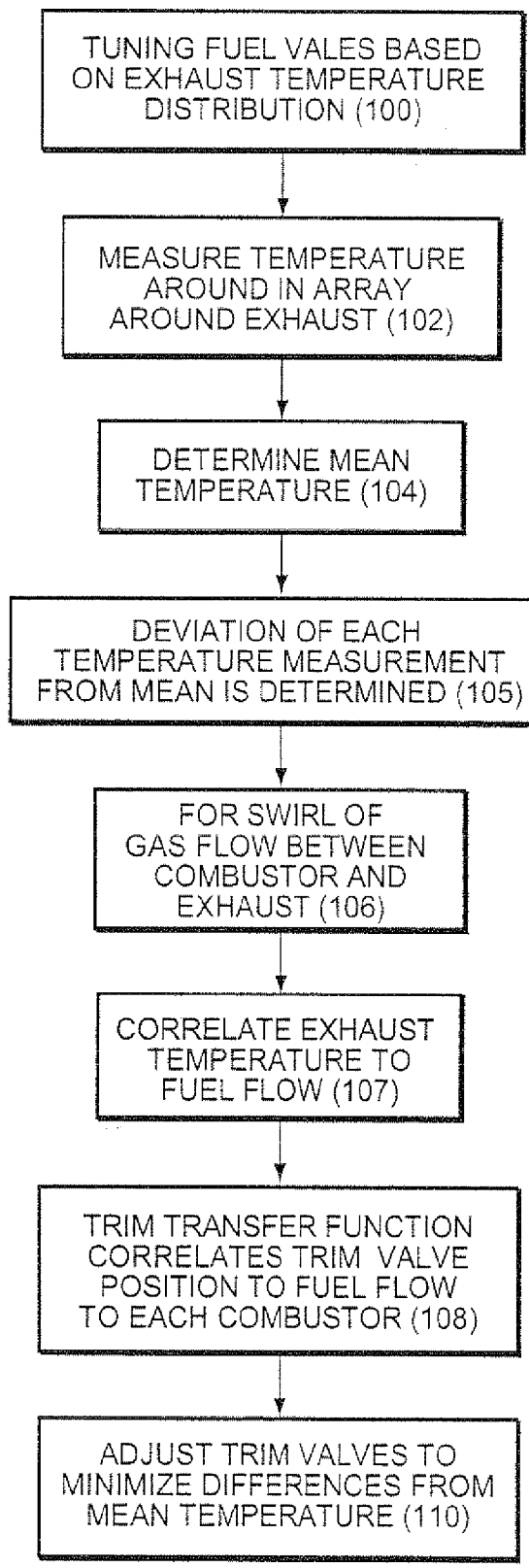
FIGS. 3 to 5 are flow charts of exemplary methods for actuating the tuning valves of the fuel manifold.
Figure 4:
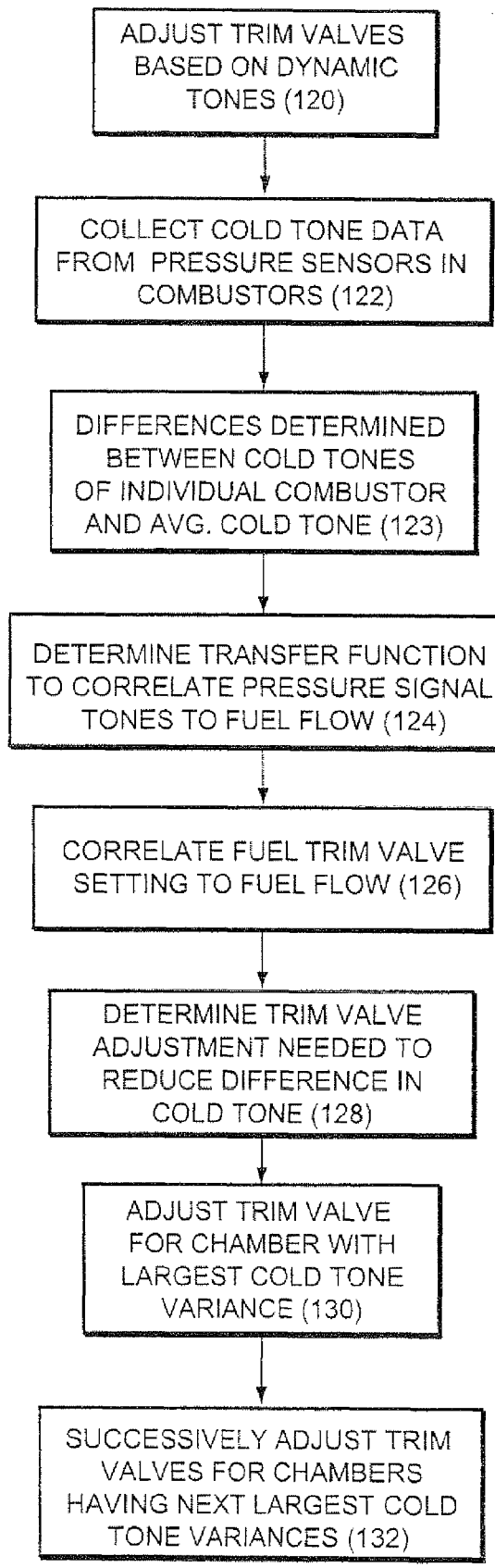
Figure 5:
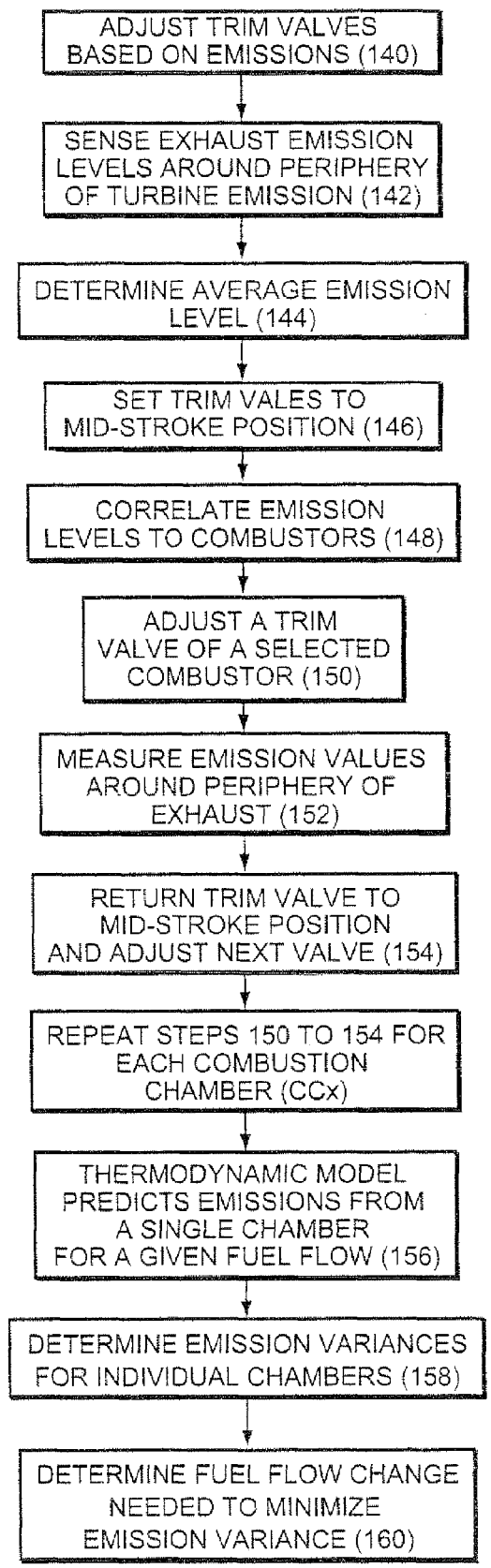

FIGS. 3 to 5 are flow charts of three methods for automatically tuning the individual fuel trim valves 28, 32 for the primary and secondary fuel lines to the nozzles in each combustion chamber in a gas turbine. These exemplary tuning algorithms allow for precise control of the fuel/flow valves based on gas turbine operating parameters.

In the first method 100, the temperature data collected from the thermocouples 40 provides data for a thermal annular temperature profile map of the exhaust gas temperatures. By adjusting for the swirl angle of the gases, the angular positions on the thermal map can be correlated to individual combustion chambers, in a manner described in U.S. Patent Application Publication No. 200/0183916 A1. The thermal map may be, for example, a polar chart showing exhaust temperature distributions in the exhaust gas corrected for the swirl angle in the gas turbine. If the polar chart of temperatures shows a relatively circular temperature distribution, the combustion chambers may be assumed to be operating at uniform combustion temperatures. A non-circular temperature chart may indicate significant temperature variations in the combustion temperatures of the chambers.

The swirl chart indicates the angle between any combustion chamber and the point where the exhaust from the combustion chamber crosses the outlet 12 of the gas turbine 10. In a typical swirl chart, gas turbine power output is shown as a percent (0 to 100%) of the turbine's rated power output capacity, e.g., the turbines nameplate capacity, versus various swirl angles in degrees (1 to 90°). At low power outputs, the swirl angle is large because the residence time of the combustion gases from the combustor to the turbine exhaust is relatively long, e.g., one second. At high output where the fuel/air volume is high, the angle is low because the combustion gases having a relatively short residence time of for example 0.1 seconds. A swirl chart showing the rotation of the turbine flows at many different percentages of nameplate capacity may be used to correlate exhaust conditions to combustion chambers. This correlation aids in tuning the gas turbine 10 at any specified level e.g., between 50% to 100% of nameplate capacity) and in tuning each combustion chamber so that variations between combustion chambers is minimized. Once the swirl data is determined, the computer controller 50 is employed to efficiently run the gas turbine at any percentage level of nameplate capacity.

The swirl chart relates a specified combustion chamber to a position in an exhaust temperature profile at various specified fuel loads. To generate a swirl chart, the fuel trim valves may be initially set at a mid-stroke position. A trim valve of a single combustor is adjusted to increase or decrease the fuel flow to create a "hot spot" in that one combustor. The hot spot in the combustor should create a corresponding hot spot in the exhaust temperature profile. The data from the exhaust thermocouple(s) will indicate a high temperature at some region in the exhaust. That exhaust region will correspond to the combustor with the "hot spot" for the percentage of rate load at which the gas turbine is operating. By increasing and decreasing the percentage of rated load of the gas turbine, the charging position in the exhaust region of the combustor hot spot can be tracked for the different load percentages. The swirl chart can be created from the data regarding the hot spot combustor and the exhaust temperature data at various loads of the gas turbine. The swirl chart can also be constructed by creating a "cold spot" in the gas turbine by decreasing flow to a combustion chamber(s) using the fuel trim valve controlling flow to that chamber.

The controller adjusts the trim valves on the fuel supply to the fuel nozzles on the individual chambers to, for example, cause the combustion temperatures in the chambers to become more uniform. This process of adjusting the trim valves is automated by the trim valve controller 50 that receives data from the thermocouples, determines whether the data indicates excessive variations in the combustion temperature distribution in the chambers, actuates appropriate trim valves to adjust the fuel flow to selected chambers, and confirms that the new exhaust gas temperature data indicates a more uniform temperature distribution.

To determine the magnitude of the fuel trim required for correcting the exhaust temperature variation, the following calculations may be performed. In step 102, the temperature data values (TX1, TX2, ... TXn) are collected representing the swirl-corrected exhaust temperatures corresponding to each of the combustion chambers in the gas turbine. In step 104, the mean (Tmean) of the exhaust temperatures is computed. The deviation (TX1Δ, TX2Δ, ... TXnΔ) of each exhaust temperature from the reference mean for each combustion chamber is determined, in step 105. The temperature data values are adjusted for the swirl of the gas flow from the combustor to the exhaust, in step 106. In this way, the exhaust temperature valves are matched with their combustors that most influence the temperature at each of the temperature sensors (TX1, TX2, ... TXn).

In step 107, from a thermodynamic model of the operation of the gas turbine, a transfer function ("FTC") is determined that relates the fuel flow rate in a combustion chamber to its corresponding exhaust temperature. An exemplary mathematical equation for correlating exhaust temperature to fuel flow is as follows:

TX (Exhaust)=FTC (fuel flow rate for each combustion chamber, air flow rate, ... other machine operating parameters).

The transfer function (FTC) models the dependence of the exhaust temperature (TX(Exhaust)) on fuel flow in a combustor chamber. From the transfer function (FTC), a relationship can be derived that indicates the amount of fuel flow rate adjustment needed to affect a desired change in exhaust temperature (TX(Exhaust)). From a knowledge of the valve flow characteristics and a computational model of the gas fuel flow in the manifolds, determine the trim transfer function (g) where fuel trim (in each fuel line)=g (FV1, FV2, ... FVn) in step 108. FV1, FV2, ... FVn describes the position of the fuel valve, e.g., open, closed or some position in-between, for each combustor 1, 2, ... n, where "n" is the total number of combustors.

From the exhaust temperature transfer function ("FTC") and the fuel trim transfer function (g), the controller 50 determines the magnitude of the change in the fuel valve setting to adjust for the deviation of the exhaust temperature of any one combustion chamber from the average, in step 110. The deviation of the exhaust temperature for one combustion chamber may be represented by a temperature variation (Tv) for that chamber. Tv is equal to (Teccx−Tgt)/Tgt, where Teccx is a temperature of the exhaust of a particular chamber, and Tgt is an average or mean exhaust temperature of the gas turbine. If Tv is positive, the combustion chamber is deemed to be operating with a relatively rich air-fuel mixture and the trim valve for that chamber should be adjusted to reduce the fuel flow rate. If Tv is negative, the combustion chamber is deemed to be operating with a relatively lean air-fuel mixture and the trim valve for that chamber should be adjusted to increase the fuel flow rate. A nominal value for Tv, e.g., one percent or less, indicates that the combustion chamber is operating at or very near the mean or average air-fuel mixture for all combustion chambers. The controller minimizes Tv by adjusting the fuel trim valves for the chamber corresponding to Tv. The controller sends control signals to the appropriate actuators 48 to adjust the fuel trim valves based on the magnitude in the change of fuel valve setting determined in step 110. The controller may minimize Tv for all of the combustion chambers in an iterative and sequential manner, such as by identifying chambers with the largest Tv and first adjusting the trim valves to those chambers.

The process of classifying the air-fuel mixture in one or more of the combustion chambers 14 as rich or lean may be facilitated by monitoring the exhaust thermocouple data as the gas turbine is, for example, slowly unloaded from 100% rated load capacity to 50% of the rated load capacity. Combustion chambers that are operating relatively rich or lean can be identified using the exhaust temperature data over a range of gas turbine operating loads. The combustion chambers operating rich (as evident from a hot spot corresponding to those chambers in the exhaust temperature profile over a range of loads) may be modulated by decreasing the fuel load via the trim valves and thereby dropping the temperature of the hot spot(s) in the exhaust temperature toward an average exhaust temperature. The lean combustion chambers (having corresponding "cold spots" in the exhaust temperature profiles) are similarly tuned by increasing their fuel load. This tuning process of collecting temperature data at one or more load settings of the gas turbines, identifying cold and hot spots in the exhaust temperature profile and adjusting the fuel trim valves for those combustion chambers corresponding to the cold and hot spots in the exhaust profile may be carried out incrementally and iteratively to minimize excessive variations in the exhaust temperature profile.

FIG. 4 is a flow chart of a second method 120, in which the combustor dynamic cold tones are obtained from the dynamic pressure sensor 52 in each combustor. The dynamic tones are an indicator for the chamber-to-chamber variation in fuel flow and fuel splits. The impact of fuel flow and split variations on the overall CO emissions can be sensed from measurements of the amplitude of the combustor "cold tone". The "cold tone" refers to a combustor oscillation frequency whose amplitude increases as the combustor firing temperature decreases.

In step 122, data is collected from each of the pressure sensors. CT1, CT2, ... CTn represent a time-averaged amplitude, e.g., over 5 minutes, of the cold tone as measured from each of the pressure sensors 54 in each of the combustion chambers in the gas turbine. The cold tone is a frequency that corresponds to a combustion chamber operating cooler than other chambers. Exemplary cold tones are in a frequency range of 70 hertz (Hz) to 120 Hz. Determinations are made of the mean cold tone amplitude value (CTmean) and of the differences between the mean and the measured cold tones in each combustion chamber, in step 123.

From a thermodynamic model of the operation of the gas turbine and the combustor, a transfer function ("FDYN") is determined that exponentially relates the fuel flow rate in a combustion chamber to its corresponding cold tone amplitude, in step 124. The cold tone (CT (amplitude)) may be modeled by the following transfer function: FDYN (fuel flow rate, air flow rate and other machine operating parameters). FDYN is typically of the form FDYN=A exp (−k*fuel flow rate), where A and k are positive constants. The fuel flow rate for a desired cold tone amplitude (CT (amplitude)) can be derived from the FDYN transfer function. By using the FDYN transfer function, a knowledge of the valve flow characteristics and a computational model of the gas fuel flow in the manifolds, a trim valve transfer function "g" is derived, in step 126. For example, Fuel trim=g (FV1, FV2, . . . FVn), where FV1, FV2, . . . FVn describes the position of the fuel valve on combustor 1, 2, . . . n, and n is the total number of combustors.

From the cold tone amplitude transfer function "FDYN" and the fuel trim transfer function "g", the controller 50 can determine the magnitude of the change in the fuel valve setting to adjust for the deviation of the cold tone amplitude of any one combustion chamber from the average or mean cold tone, in step 128. The controller signals the actuators to make the appropriate changes to the fuel trim valve settings to reduce deviations in the cold tone from the mean cold tone. Based on the measured cold tones, the chambers with the greatest deviations, i.e., the outlying chambers, in cold tones from the time-averaged cold tone may be first adjusted in step 130. Next, the fuel trim valves on each outlying combustion chamber is adjusted to minimize the combustor pressure oscillations for each outlying chamber in step 132.

FIG. 5 is a flowchart of a method 140 using exhaust stack CO emission to tune a gas turbine. The carbon monoxide (CO) emissions in the turbine exhaust are measured by emission sensors at the circumferential emission sensor ports $EP_1$, $EP_2$, . . . $EP_n$ arranged around the periphery of the exhaust, in step 142. These emission sensors provide data on the CO emission distribution in the combustion chambers in a similar manner to the temperature distribution in the chambers is obtained from temperature sensors in the exhaust. The exhaust stack-average emission sensor port EPC in the exhaust stream provides data on an average emission level, in step 144. Alternatively, the average emission level may be an mathematical average or mean emission level as measured by all of the emission sensor ports ($EP_1$ to $EP_n$). The difference between the emission level as measured by each individual circumferential sensor port and the emission average provides a measure of the chamber-to-chamber fuel flow variations in the gas turbine.

In step 146, the fuel trim valves may be initially set to a certain mid-stroke position. In step 148, the CO emission data is collected from sensors $EP_1$ to $EP_n$; where n is the number of circumferential emission sensors in the exhaust stream. Let CO1(ref), CO2(ref) . . . COn(ref) be the measurements obtained from the emission sensors $EP_1$ to $EP_n$. CO_Stack (ref) is a value that represents the measured values of the CO emissions from the stack-average CO (as measured by EPC) with the valves in mid-stroke position.

In step 150, a fuel trim change of a known magnitude is introduced to a single combustion chamber, e.g., CC1, by activating the appropriate actuator 48 to operate the fuel valve 28 for CC1 in the corresponding supply line. In step 152, measure the corresponding CO emissions in the exhaust: CO1 (trim_1), CO2 (trim_1), . . . Con (trim_1), and CO_Stack (trim_1), where trim 1 represents an adjustment, e.g., fuel spike, to the trim valve on combustor CC1. The fuel trim magnitude change in step 150, may be of the order of 1 to 2% of the overall fuel flow to the combustion chamber and should be such that it does not interfere with the regular combustion operation. In step 154, return the fuel trim valve in CC1 to the mid-stroke position and adjust the trim valve for combustor CC2. Repeat steps 150 to 154 for each of the combustion chambers CC2, CC3 . . . CCn, where n is the total number of combustion chambers. Further, steps 150 to 154 may be repeated at different fuel loads for the gas turbine In step 156, develop a thermodynamic model that predicts the production of the CO emissions from a single combustion chamber. The model may be a relationship such as:

$$CO\_single\_chamber = B \exp(-m*fuel\_flow\_rate)$$

where CO_single_chamber is the CO production rate from a single combustion chamber, and B and m are positive constants. The fuel flow rate as a function of CO emissions for a single chamber may be derived from the thermodynamic model. In addition, CO measured at the exhaust stack downstream can be computed from a knowledge of the CO production at each combustion chamber. Accordingly, the CO emission levels sensed by sensors in the turbine exhaust can be correlated to the fuel flow rates to the individual combustion chambers.

From a knowledge of the valve flow characteristics and a computational model of the gas fuel flow in the manifolds, determine the trim transfer function "g" e.g., fuel trim (in each fuel line)=g (FV1, FV2, . . . FVn). FV1, FV2, . . . FVn describes the position of the fuel valve on combustor chamber CC1, CC2, CCn. From the measurements of the reference CO emissions, CO1 (ref), CO2 (ref), . . . , COn (ref), CO_stack (ref) and the CO emissions measured upon introducing a known fuel trim in each of the combustion chambers, CO1 (trim), CO2 (trim) . . . , COn (trim), CO_stack (trim), the thermodynamic transfer function CO_single_chamber, and the fuel trim transfer function "g", the controller 50 can determine the magnitude of the change in the fuel valve setting to adjust for the deviation of the fuel flow of any one combustion chamber from the average.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present application cover all suitable modifications and variations as come within the scope of the appended claims and their equivalents.

What is claimed is:

1. A method for adjusting fuel flow to individual combustion chambers in a gas turbine having fuel nozzles for each combustion chamber, manifolds for supplying fuel to at least one fuel nozzle in each combustion chamber, wherein the manifolds have flow metering devices for said fuel nozzles and a controller for adjusting the flow metering devices, said method comprising:

a. supplying fuel to the combustion chambers through at least one of said manifolds;

b. combusting the fuel in the combustion chambers and generating exhaust gases which drive the gas turbine;

c. sensing a condition of the exhaust gases at various exhaust regions in the exhaust gas before performing step d;

d. actuating a corresponding flow metering device to the one of the combustion chambers to adjust fuel flowing to the one of the combustion chambers;

e. after step d, sensing a condition of the exhaust gases at various exhaust regions in the exhaust gases;

f. determining a change in the condition of the exhaust gas due to the actuation of the corresponding flow metering device in step d and based on a comparison of the conditions of the exhaust gases sensed in steps c and e;

g. correlating the change in the sensed condition of the exhaust gases to the at least one combustion chamber, and h. repeating steps d through g wherein the one of the combustion chambers becomes another one of the combustion chambers.

2. The method of claim 1 wherein the gas turbine is an industrial gas turbine and further comprising driving a utility power generator.

3. The method of claim 1 further comprising repeating steps e through g for each combustion chamber in the gas turbine.

4. The method of claim 1 further comprising adjusting the flow metering device for the one of the combustion chambers to reduce the determined rich or lean condition in the one of the combustion chambers.

5. The method of claim 1 wherein the sensed condition is exhaust temperature.

6. The method of claim 1 wherein the sensed condition is exhaust emissions.

7. The method of claim 6 wherein the exhaust emissions is carbon monoxide emissions.

8. A method for adjusting fuel flow to individual combustion chambers in a gas turbine having fuel nozzles for each combustion chamber, and manifolds for supplying fuel to at least one fuel nozzle in each combustion chamber, wherein the manifolds have flow metering devices for said fuel nozzles, said method comprising:

a. supplying fuel to the combustion chambers through at least one of said manifolds;

b. combusting the fuel in the combustion chambers and generating exhaust gases which drive the gas turbine;

c. actuating the flow metering device corresponding to a selected one of the combustion chambers to vary fuel flowing to the selected combustion chamber while maintaining a constant fuel flow to the other combustion chambers;

d. sensing a condition of the exhaust gases at various exhaust regions in the exhaust gases;

e. identifying a region of the exhaust in which the sensed conditions varies in response to the actuation of the flow metering device;

f. correlating the identified region to the corresponding combustion chamber, and g. adjusting the flow metering device for the corresponding combustion chamber while continuing to sense the condition of the exhaust gas at the identified region of the exhaust, wherein the adjustment and sensing of the condition is performed to minimize a rich or lean fuel flow to the corresponding combustion chamber.

9. The method of claim 8 wherein the gas turbine is an industrial gas turbine and further comprising driving a utility power generator.

10. The method of claim 8 further comprising periodically repeating steps (c) to (g).

11. The method of claim 8 wherein the sensed condition is exhaust temperature.

12. The method of claim 8 wherein the sensed condition is exhaust emissions.

13. The method of claim 8 wherein the exhaust emissions is carbon monoxide emissions.

14. A method to tune fuel flow to individual combustion chambers of a gas turbine comprising:

a) measuring exhaust gas temperatures at a plurality of exhaust regions of the gas turbine;

b) correlating one of the measured exhaust gas temperatures to one of the combustion chambers using a swirl chart relating the exhaust regions to corresponding combustion chambers;

c) identifying at least one of the combustion chambers as operating at an air-fuel mixture substantially different from a representative air-fuel mixture for all chambers based on the measured exhaust gas temperature correlated to the identified chamber, d) adjusting a fuel flow to the identified at least one of the combustion chambers to minimize a difference between the air-fuel mixture in the identified combustion chamber and the representative air-fuel mixture, and e) repeating steps a to d for each of the combustion chambers and until the difference is reduced for a plurality of the combustion chambers.

15. The method of claim 14 wherein the swirl chart is for a specified fuel load of the gas turbine.

16. The method of claim 14 wherein the representative fuel air-mixture is represented by an average exhaust gas temperature, the air-fuel mixture of the identified chamber is represented by the measured exhaust gas temperature correlated to the identified chamber, and the difference is a difference between the measured exhaust gas temperature correlated to the identified chamber and the average exhaust gas temperature.

17. The method of claim 14 further comprising repeating steps (a) to (d) for a plurality of identified combustion chambers.

18. The method of claim 14 wherein the difference between the measured exhaust gas temperature and the average exhaust temperature is minimized to one percent.

19. A method to tune fuel flow to individual combustion chambers of a gas turbine comprising:

a) measuring exhaust gas temperatures at a plurality of exhaust regions of the gas turbine;

b) correlating one of the measured exhaust gas temperatures to one of the combustion chambers using a swirl chart relating the exhaust regions to corresponding combustion chambers, artificially elevating a fuel flow to a selected combustion chamber and observing a higher exhaust gas temperature for one of said exhaust gas regions to correlate the region to the selected chamber;

c) identifying at least one of the combustion chambers as operating at an air-fuel mixture substantially different from a representative air-fuel mixture for all chambers based the measured exhaust gas temperature correlated to the identified chamber, and d) adjusting a fuel flow to the identified at least one of the combustion chambers to minimize a difference between the air-fuel mixture in the identified combustion chamber and the representative air-fuel mixture.

20. The method of claim 14 further comprises correlating each combustion chamber to a corresponding exhaust gas temperature, and comparing the corresponding exhaust gas temperature to a representative exhaust gas temperature.

21. The method of claim 20 wherein comparing the corresponding exhaust gas temperature yields a temperature variation (Tv) for the identified combustion chamber, and Tv is equal to (Teccx−Tgt)/Tgt, where Teccx is a temperature of the exhaust of the identified chamber Tgt is an average exhaust temperature of the gas turbine, and Tv represents the difference to be minimized.

22. The method of claim 14 wherein the air-fuel mixture is represented by a measured fuel pressure (Pccx) for the identified combustion chamber and the difference is a difference in fuel pressure (Pv) wherein Pv equals (Pccx−Pgt)/Pgt, and Pgt is an average fuel pressure for all chambers.

23. A method to adjust fuel flow to individual combustion chambers in a gas turbine having a fuel nozzle for each combustion chamber, a manifold for supplying fuel to the fuel nozzle for each combustion chamber, wherein the manifold includes a flow metering device regulating fuel flow to the fuel nozzles, said method comprising:
   a. supplying fuel to the combustion chambers through the manifold;
   b. combusting the fuel in the combustion chambers and generating exhaust gases from the combustion which drive the gas turbine;
   c. sensing temperatures of the exhaust gases at each of a plurality of positions arranged radially about an flow axis of the exhaust gases and generating a first exhaust temperature profile from the temperatures sensed in step c and before step d;
   d. actuating the flow metering device for a selected one of the combustion chambers to adjust fuel flowing to the selected combustion chamber and not adjusting fuel flow to the nozzles for the other combustion chambers;
   e. after step d, sensing temperatures of the exhaust gases at each of the positions arranged radially about the flow axis of the exhaust gases and generating a second exhaust temperature profile from the temperatures sensed in step e;
   f. comparing the first and second exhaust temperature profiles to determine a change in temperature of the exhaust gas due to the actuation of the flow metering device for the selected combustion chamber;
   g. correlating the change in the temperature of the exhaust gases to the selected combustion chamber, and
   h. repeating steps d through g wherein another of the combustion chamber becomes the selected combustion chamber.

24. The method of claim 23 wherein the gas turbine is an industrial gas turbine and further comprising driving a utility power generator.

25. The method of claim 23 wherein the step h includes performing steps d though g for each combustion chamber in the gas turbine.

26. The method of claim 23 further comprising adjusting the flow metering device for the selected combustion chamber based both on the determined change in temperature and the correlation of the change in the temperature of the exhaust gases.

27. The method of claim 26 wherein the adjustment based on the determined change in temperature includes determining whether the selected combustion chamber has a fuel rich or fuel lean combustion condition and the adjustment compensates for the condition.

\* \* \* \* \*

UNITED STATES PATENT AND TRADEMARK OFFICE
CERTIFICATE OF CORRECTION

PATENT NO. : 8,061,118 B2
APPLICATION NO. : 11/855638
DATED : November 22, 2011
INVENTOR(S) : Vasanth Kothnur et al.

Page 1 of 1

It is certified that error appears in the above-identified patent and that said Letters Patent is hereby corrected as shown below:

At column 12, line 6, delete "...Con (trim_1)" and insert --...COn (trim_1)--

Signed and Sealed this
Thirty-first Day of January, 2012

David J. Kappos
*Director of the United States Patent and Trademark Office*